United States Patent
Kumar et al.

(10) Patent No.: US 11,589,243 B2
(45) Date of Patent: Feb. 21, 2023

(54) DYNAMIC ADJUSTMENT OF DEPLOYMENT LOCATION OF SOFTWARE WITHIN A NETWORK

(71) Applicant: Harmonic, Inc., San Jose, CA (US)

(72) Inventors: Nitin Kumar, San Ramon, CA (US); Andrii Vladyka, Pleasanton, CA (US); Ihor Kopieichyk, Santa Clara, CA (US); Arkady Gilinsky, Yoqneam Ilit (IL); Pavlo Shcherbyna, Kyiv (UA)

(73) Assignee: Harmonic, Inc., San Jose, CA (US)

( * ) Notice: Subject to any disclaimer, the term of this patent is extended or adjusted under 35 U.S.C. 154(b) by 0 days.

(21) Appl. No.: 17/316,442

(22) Filed: May 10, 2021

(65) Prior Publication Data

US 2021/0360426 A1    Nov. 18, 2021

Related U.S. Application Data

(60) Provisional application No. 63/023,725, filed on May 12, 2020.

(51) Int. Cl.
*G06F 9/50* (2006.01)
*H04L 67/10* (2022.01)
(Continued)

(52) U.S. Cl.
CPC .......... *H04W 16/18* (2013.01); *G06F 9/4806* (2013.01); *G06F 9/50* (2013.01); *G06F 9/5088* (2013.01);
(Continued)

(58) Field of Classification Search
CPC ........ H04W 16/18; G06F 9/4806; G06F 9/50; G06F 9/5088; G06F 9/48; H04L 41/12;
(Continued)

(56) References Cited

U.S. PATENT DOCUMENTS

| 10,498,655 B1 | 12/2019 | Nitzan et al. |
| 2002/0178214 A1 | 11/2002 | Brittenham et al. |

(Continued)

OTHER PUBLICATIONS

Alharbi et al., Performance Comparison of R-PHY and R-MACPHY Modular Cable Access Network Architectures, IEEE Transactions on Broadcasting, Mar. 2018, vol. 64, No. 1, p. 1-18 (Year: 2018).*

(Continued)

*Primary Examiner* — Tonia L Dollinger
*Assistant Examiner* — Joseph M Cousins
(74) *Attorney, Agent, or Firm* — Brokaw Patent Law PC; Christopher J. Brokaw

(57) ABSTRACT

Optimizing a performance of a software function withing a content distribution network, such as a software-implemented virtual cable modem termination system (CMTS) network, a virtualized Radio Access Network (vRAN), a Passive Optical Network (PON), or a Wi-Fi network. The performance may be optimized by dynamically changing a deployment location within the content distribution network for the software function from an original location to an updated location using an instance management platform. The deployment location may be dynamically changing in response to a variety of trigger conditions or concerns, such as but not limited to a difference in compute resources, responding to latency needs or tolerances, and a desired cohabitation of data or other software.

20 Claims, 9 Drawing Sheets

(51) Int. Cl.
  *G06F 9/48* (2006.01)
  *H04L 41/5054* (2022.01)
  *H04W 16/18* (2009.01)
  *H04L 41/12* (2022.01)
  *H04L 41/14* (2022.01)

(52) U.S. Cl.
  CPC .............. *H04L 41/12* (2013.01); *H04L 41/14* (2013.01); *H04L 67/10* (2013.01); *G06F 9/48* (2013.01); *H04L 41/5054* (2013.01)

(58) Field of Classification Search
  CPC ..... H04L 41/0816; H04L 41/14; H04L 67/10; H04L 41/5054; H04L 43/0882; H04L 43/08
  See application file for complete search history.

(56) References Cited

U.S. PATENT DOCUMENTS

| | | | |
|---|---|---|---|
| 2009/0094378 A1 | 4/2009 | Reus et al. | |
| 2010/0318999 A1* | 12/2010 | Zhao | G06F 9/5044 718/104 |
| 2013/0145412 A1 | 6/2013 | Perlman et al. | |
| 2014/0269293 A1* | 9/2014 | Patrick | H04L 47/32 370/233 |
| 2015/0006615 A1 | 1/2015 | Wainner et al. | |
| 2021/0136178 A1* | 5/2021 | Casey | G06N 20/00 |
| 2021/0160090 A1* | 5/2021 | Orban | H04L 12/281 |
| 2021/0168203 A1* | 6/2021 | Parulkar | H04L 67/1085 |

OTHER PUBLICATIONS

Varia, "Migrating your Existing Applications to the AWS Cloud." A Phrase-driven Approach to Cloud Migration (2010): 1-23, Oct. 2010 (Oct. 10) Retrieved on Jul. 18, 2021 from <http://d1.awsstatic.com/whitepapers/cloud-migration-main.pdf>.

Laufer, "It's Alive! Getting to Successful R-PHY Deployment: Do's and Don'ts." ISBE and NCTA. Oct. 25, 2018. Retrieved on Jul. 18, 2021 from <http://www.google.com/url?sa=t&rct=j&q=&esrc=s&source=web&cd=&cad=rja&uact=8&ved=2ahUKEwi4lp699e3xAhVMOs0KHdMxBrcQFjAEegQIAxAD&url=https%3A%2F%2Fwww.nctatechnicalpapers.com%2FPaper%2F2018%2F2018-it-s-alive-getting-to-successful-r-phy-deployment-do-s-and-don-ts%2Fdownload@usg=AOvVaw0ReNIvkTHBTsln3sbtdVIZ>.

Bari et al., "Dynamic Controller Provisioning in Software Defined Networks." Proceedings of the 9th International Conference on Network and Service Management (CNSM 2013). IEEE, 2013. Oct. 18, 2013. Retrieved on Jul. 18, 2021 from <https://ieee.xplore.ieee.org/abstract/document/6727805>.

\* cited by examiner

DYNAMIC ADJUSTMENT OF DEPLOYMENT LOCATION OF SOFTWARE WITHIN A NETWORK

CLAIM OF PRIORITY

This application claims priority to U.S. Provisional Patent Application Ser. No. 63/023,725, filed May 12, 2020, invented by Nitin Kumar et al., entitled "Dynamic Adjustment of Deployment Location of Software Within a Network," the entire contents of which are hereby incorporated by reference for all purposes as if fully set forth herein.

FIELD OF THE INVENTION

Embodiments of the invention relate to optimizing the performance of software within a network, such as a content delivery network (CDN), by adjusting its deployment location within the network.

BACKGROUND

In some cases, a network architect might decide to implement a function within the network at a different location than that chosen by another network architect. For example, one cable operator may choose to implement a software function solely at a central location in the cable network, while another cable operator might implement that same function at multiple locations throughout the cable network. The choice of where to implement each software function is typically made before installation of hardware resources and that deployment choice typically cannot change during ongoing use of the cable network, at least not without considerable effort and cost.

If the location at which a software function is performed is changed, then that change typically requires a tremendous amount of effort due to new or updated hardware installation, the resulting software installation, and the testing associated with the new hardware and software, to say nothing of the associated financial cost. As a result, the deployment location of software typically does not migrate absent a serious undertaking of upgrading a good-sized portion of the network, typically performed precisely for the sole purpose of redesigning the process flow for that software.

A network designer may base the decision of where to deploy certain software functions in a network based, at least in part, upon the anticipated availability of compute resources at various locations within the network. A compute resource encompasses some amount of hardware resources and software resources bounded for the purposes of executing or performing some number of functions, typically but not necessarily, software functions. For example, a set of compute resources dedicated to a software function may include a certain amount of hardware memory, CPU processing cycles, and a certain amount of access to persistent storage. Another example of a compute resource is a portion of network bandwidth allocated to a software function. Technically speaking, a portion of network bandwidth is not a characteristic of a hardware device upon which a software function executes; nevertheless, network bandwidth is another dimension that may be monitored, controlled, and shared between software functions.

In a cable network, a certain amount of compute resources resides at the headend, while a certain amount of compute resources resides somewhere between the headend and the customer premises equipment (CPE). Compute resources may reside outside the cable headend at a Remote PHY Node (RPN), at a Remote MAC-PHY Node (RMN), or at a switch, for example. Compute resources may exist at different relative locations in terms of proximity to the headend/datacenter and the cable subscriber. FIG. 1 is a block diagram that depicts one example of a Cable Modem Termination System (CMTS) environment as known in the prior art. Compute resources may be available at a plethora of locations accessible via the Internet, at the CCAP Core (located at the cable headend), at each RPN, at each Remote PHY Device (RPD) comprised within an RPN, and at each cable modem (which may, but need not be DOCSIS compliant). A greater amount of compute resources is typically available at the headend/datacenter, but the use of compute resources in the headend typically involves greater latency with respect to the end user using customer premises equipment (CPE) than those compute resources disposed closer in proximity in the network to the end user.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for optimizing a performance of a software function within a network, such as a content delivery network (CDN), are presented herein. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form or discussed at a high level to avoid unnecessarily obscuring teachings of embodiments of the invention.

Embodiments of the invention provide a sharp contrast over the prior art by enabling the deployment location of various software functions within a network, such as but not limited to a CDN, to be dynamically adjusted. Embodiments of the invention advantageously allow the deployment location of software within the network to be dynamically changed based on one or more factors and/or in response to one or more observed events.

Figure 2A:
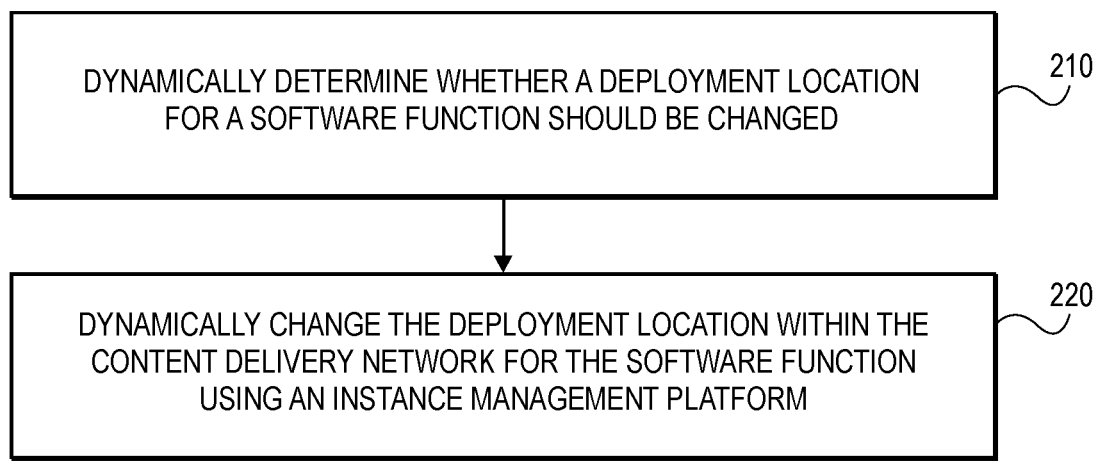
FIG. 2A is a flowchart of the functional steps of optimizing a performance of a software function by dynamically changing its deployment location in accordance with an embodiment of the invention.

FIG. 2 is a flowchart of the functional steps of optimizing a performance of a software function by dynamically changing its deployment location within a network in accordance with an embodiment of the invention. The steps of FIG. 2 may be performed in conjunction with a wide variety of networks, such as but not limited to a CDN. Non-limiting, illustrative examples of a CDN in which an embodiment may be employed include a software-implemented virtual cable modem termination system (CMTS) network, a virtualized Radio Access Network (vRAN), a Passive Optical Network (PON), and a Wi-Fi network. A CDN may also access distributed compute resources over other networks, e.g., the Internet or a cellular network. For purposes of providing a concrete example, FIG. 2 will chiefly be described in terms of illustrative embodiments involving a cable network, although embodiments may also be deployed in networks in other technical contexts and/or industries.

In step 210 of FIG. 2, a determination is dynamically made as to whether a deployment location of a software function within a network should be changed. It may be deemed desirable to dynamically adjust the deployment location of a software function for a variety of different reasons, such as to optimize the performance of the software function or to reduce latency with respect to a user's experience. In an embodiment, the deployment location of a software function may be adjusted to reside in a different virtual machine on the same physical machine as the original location so that the software function has access to a different set of compute resources. In other embodiments, the deployment location of a software function may be adjusted to reside in a different physical machine than the original location so that the software function is performed in a different physical location in the CDN in addition to having access to a different set of compute resources.

The dynamic adjustment of the deployment location of a software function may be performed to achieve a desired network latency in the dynamically measured round-trip journey between the deployment location and the end user of the software function. The dynamic adjustment of deployment location may also be dynamically adjusted in real time based on an observed set of available compute resources at the original deployment location, or at the new deployment location, or both.

Figure 2B:
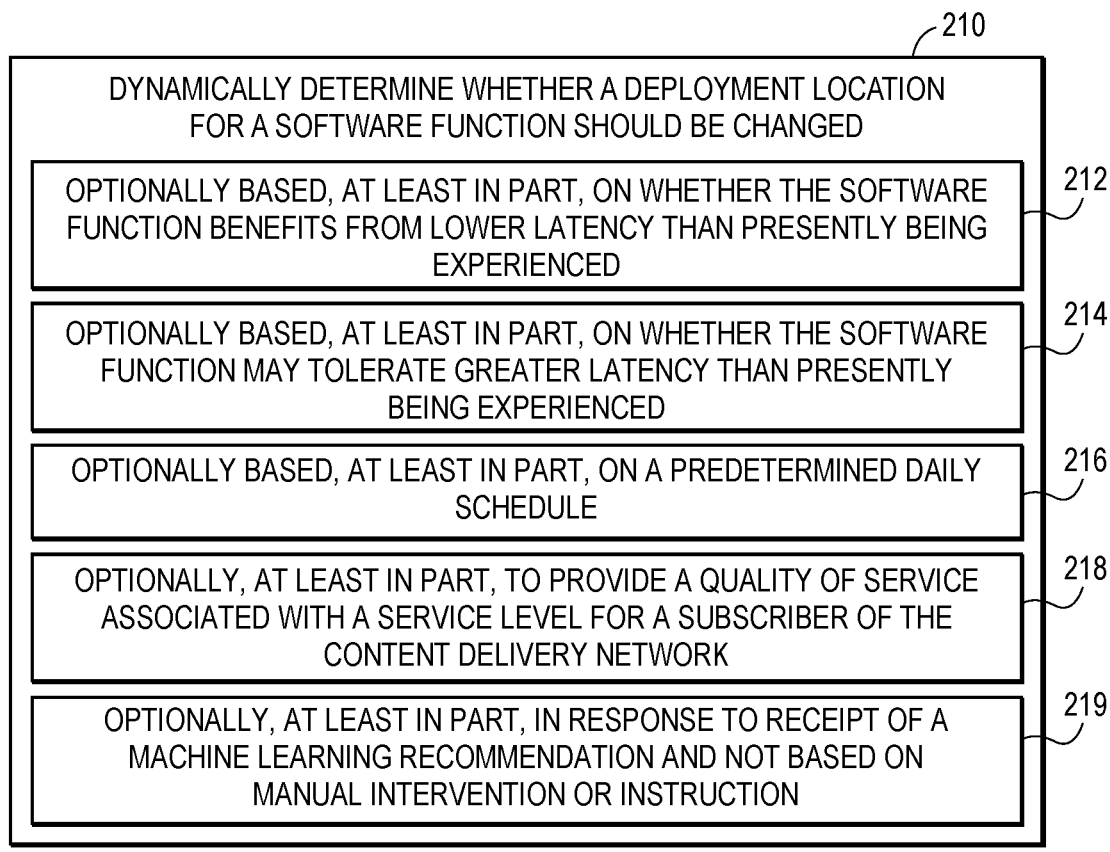
FIG. 2B is a illustration of certain ways of dynamically determining whether a deployment location for a software function should be changed in accordance with various embodiments of the invention.

As shown in step 216 of FIG. 2B, certain embodiments may deem it beneficial to adjust the deployment location of certain software functions based on the time of day or date. If certain usage patterns over the course of a day or a length of days are known, the deployment location of software functions may be dynamically adjusted to make the best use of the available compute resources over the course of those usage patterns. For example, certain services may be more popular, and thus more widely used, during evening hours or on weekends. In view of the additional load on the network, the deployment location of software functions may be dynamically adjusted within the network to make best use of the available compute resources during such high use times.

Embodiments may also deem it beneficial to adjust the deployment location of certain software functions based on an observed priority associated with a particular end user or a particular software function, as shown in step 218 of FIG. 2B. For example, certain embodiments may wish to ensure that certain end users receive a certain Quality of Service (QoS) associated with their service agreement. To that end, certain software functions might be dynamically moved to be closer to end users to minimize the perceptible latency in their function by those end users. Also, certain sets of users may be entitled to receive certain services that are not generally available, such as certain content or services which require a subscription or additional compensation for their use. In such a case, embodiments may adjust the deployment location of certain software functions based on what services or content subscribers are entitled to access.

Embodiments further enable the dynamic configuration, or reconfiguration, of how certain software functions in the network are performed, as certain software functions may benefit from cohabitation with other applications and/or data at their location, and as a result, may have their performance optimized, augmented, or enhanced based on the additional capabilities or new operational options available due to collocated data and software.

Figure 1:
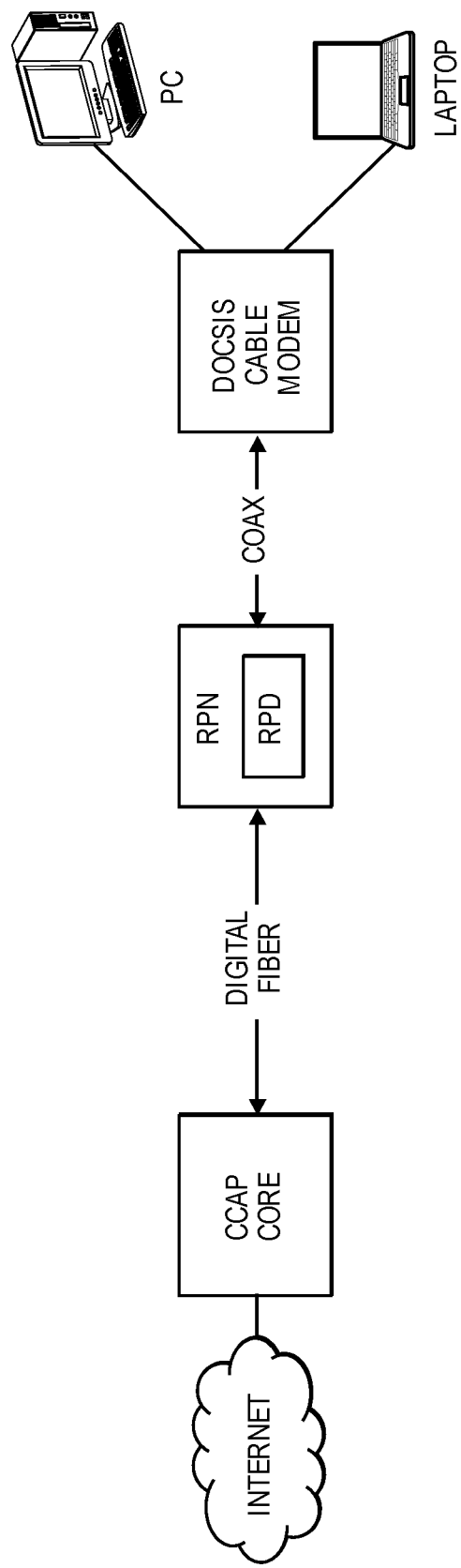
FIG. 1 is a block diagram that depicts one example of a cable modem termination system (CMTS) environment as known in the prior art.

When the needs of a particular network customer have changed, embodiments enable the deployment location of software functions performed on behalf of that customer to migrate to best suit their current needs in view of the available compute resources within the network. To illustrate a concreate example, embodiments of the invention could enable software functions currently being performed at CCAP Core depicted in FIG. 1 to be migrated closer to the end user, e.g., at a RPN or RPD, a switch (not shown in FIG. 1), or even potentially closer to a cable modem. As shall be explained below, some embodiments of the invention would enable software functions currently being performed at CCAP Core to be migrated further away from the end user, e.g., to a location accessible over the Internet upstream from the CCAP Core.

Figure 3:
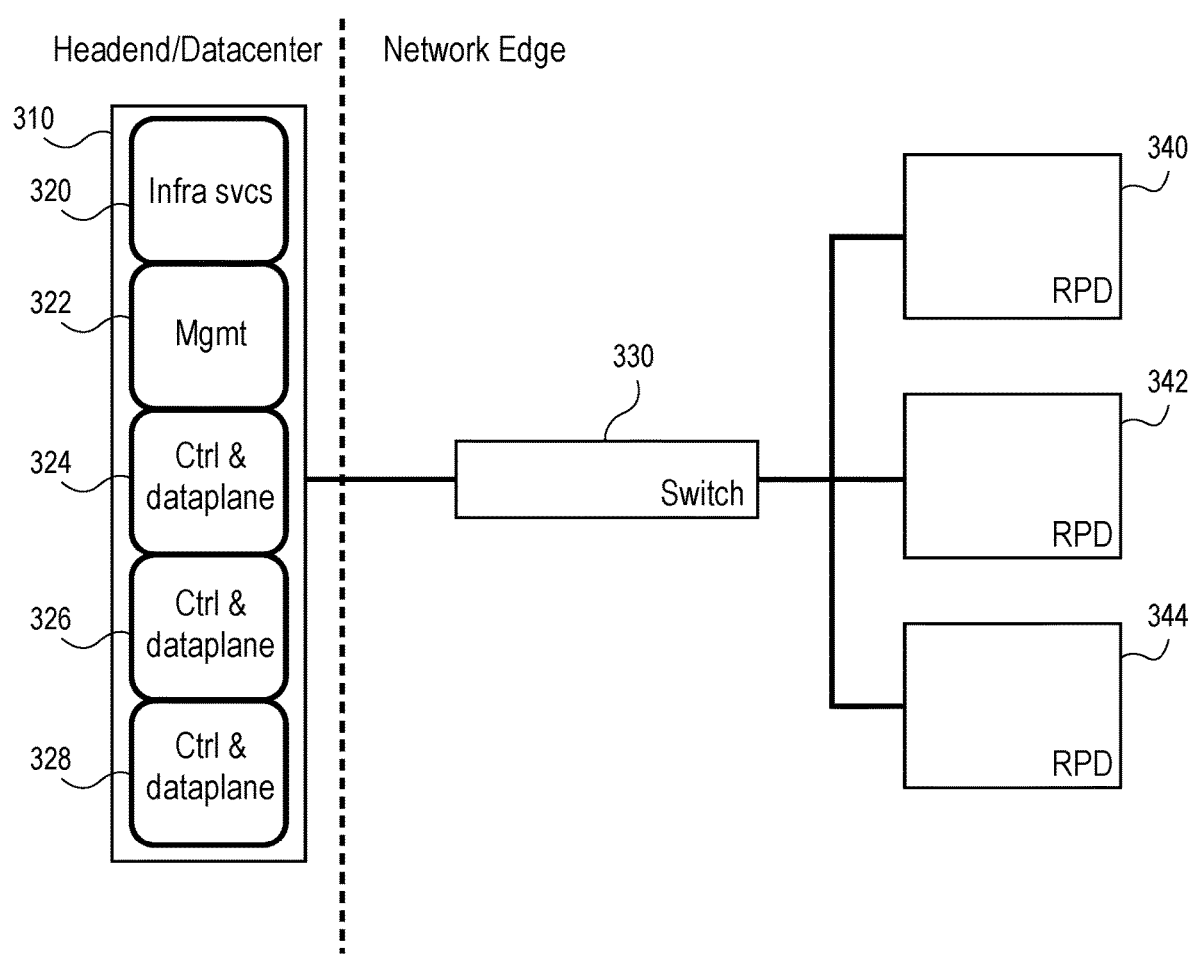
FIG. 3 is a block diagram of an illustrative CDN comprising several Remote PHY nodes (RPNs) in which an embodiment of the invention may be employed.

FIG. 3 is a block diagram of a simple CDN in which an embodiment of the invention may be employed. The CDN shown in FIG. 3 is a cable network comprising a headend/datacenter portion and a network edge portion. The headend/datacenter includes a Converged Cable Access Platform (CCAP) 310 and the network edge portion comprises a plurality of network equipment, such as switch 330 and Remote PHY devices (RPDs) 340, 342, and 344 shown in FIG. 3.

CCAP 310, as broadly used herein, refers to a functional component for providing high speed data services, such as Internet access, to subscribers. CCAP 310 may execute on one or more computer systems in a fault tolerant and scalable fashion. CCAP 310 may be implemented as a cohesive plurality of software units that are responsible for various services. For example, FIG. 3 depicts CCAP 310 as comprising software unit 320 responsible for performing infrastructure services 320, software unit 322 responsible for management services, and software units 324, 326, and 328 each responsible for control and dataplane functions. Control functions are responsible for determining which path to use to send a packet or frame, while dataplane functions are responsible are responsible for forwarding packets or frames from one interface to another based on the instruction of control functions.

Figure 4:
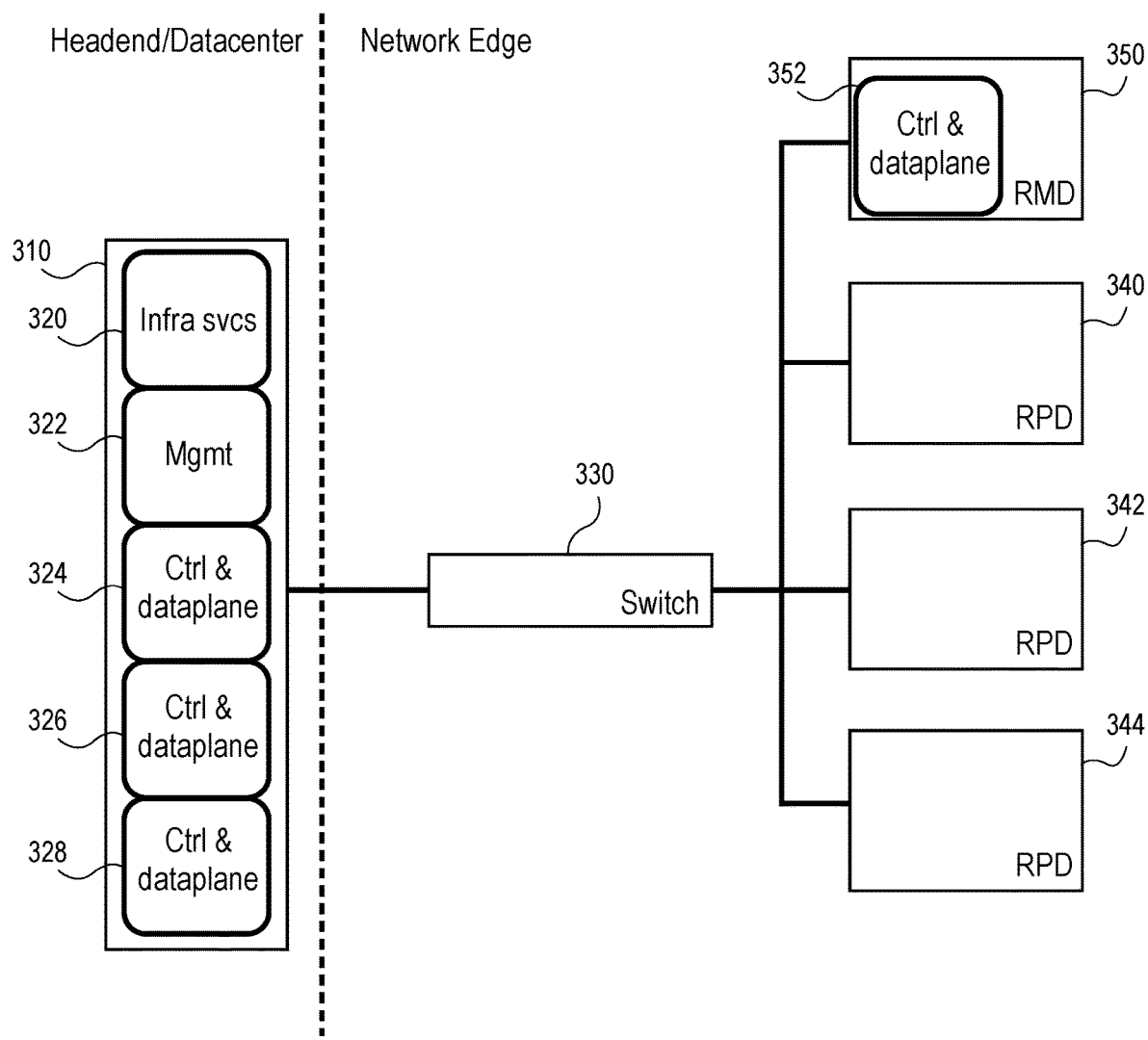
FIG. 4 is a block diagram of an illustrative CDN comprising several RPNs and a Remote MACPHY node (RMN) in which an embodiment of the invention may be employed.

FIG. 4 is another block diagram of a simple CDN in which an embodiment of the invention may be employed. FIG. 4 depicts the same components as FIG. 3 but further includes Remote MACPHY Node (RMN) 350. Remote MACPHY nodes are distinguishable over Remote PHY Devices in that Remote MACPHY nodes allow for certain software to be deployed thereon due to their possession of additional compute resources which Remote PHY Devices typically lack. To illustrate, note that FIG. 4 depicts software unit 352 being deployed on RMN 350. Software unit 352, deployed on RMN 350, may perform MACPHY control and dataplane functions for RMN 350.

RPDs are not presently implemented to support excessive compute workloads. The limited spare CPU capability of a RPD that is typically presently available may still be used for light compute workloads, such as pushing periodic metrics to CCAP 310. However, additional compute resources may be added to RPDs in the future. As more powerful CPUs enable compute-heavy applications, it is contemplated that the physical hardware implementing a RPD may support additional compute workloads at some point. It is also contemplated that a RPD may be upgraded within the field to possess additional compute resources, e.g., by coupling or augmenting a presently deployed RPD with a compute module possessing additional compute resources.

In an embodiment, the change of deployment location of the software function may be performed using an instance management platform. Non-limiting, illustrative examples of an instance management platform that may be used by embodiments include Kubernetes and Docker swarm. For this reason, each of the software units depicted in FIGS. 3 and 4 may execute in a container or a pod managed by an instance management platform. For example, in FIG. 3, one or more of software units 320, 322, 324, 326, and 328 may execute in a container or pod. It is only necessary for a software unit to execute in a container or pod to facilitate a change in its deployment location. If it is not desirable to change the deployment location of a certain software unit, then it need not execute within a container or pod. To illustrate, note that software unit 352, deployed on RMN 350 as shown in FIG. 4, may, but need not, execute in container or pod to perform control and dataplane functions for RMN 350.

Embodiments of the invention perform failure detection of software processes in less time, and more efficiently, than off-the-shelf Kubernetes or other similar instance management platforms. Embodiments do so by actively polling software processes and observing behavior within a pod or container to ensure that all software processes within the pod or container are active and operational. As it is known what software processes are executing within the pod or container, embodiments can detect when a software process encounters a failure with far greater efficiency than off-the-shelf instance management platforms. Knowledge of what activity within a pod or container constitutes expected healthy activity allows for any deviation thereof to be detected with greater efficiency and speed than off-the-shelf instance management platforms.

Certain embodiments may employ machine learning techniques in the performance of step 210, as illustrated in step 219 of FIG. 2B. For example, a software function may be moved to an updated location in response to receipt of a machine learning recommendation. In this way, the determination of step 210 may be made entirely without manual intervention or instruction in certain embodiments, although other embodiments allow for such.

In step 220, after determining that the deployment location of a software function should be changed, the deployment location of the software function is dynamically changed from an original location to an updated location. The change of deployment location of the software function from the original location to the updated location is performed by moving the pod or container comprising the software function from the original location to the updated location using the instance management platform.

Figure 5:
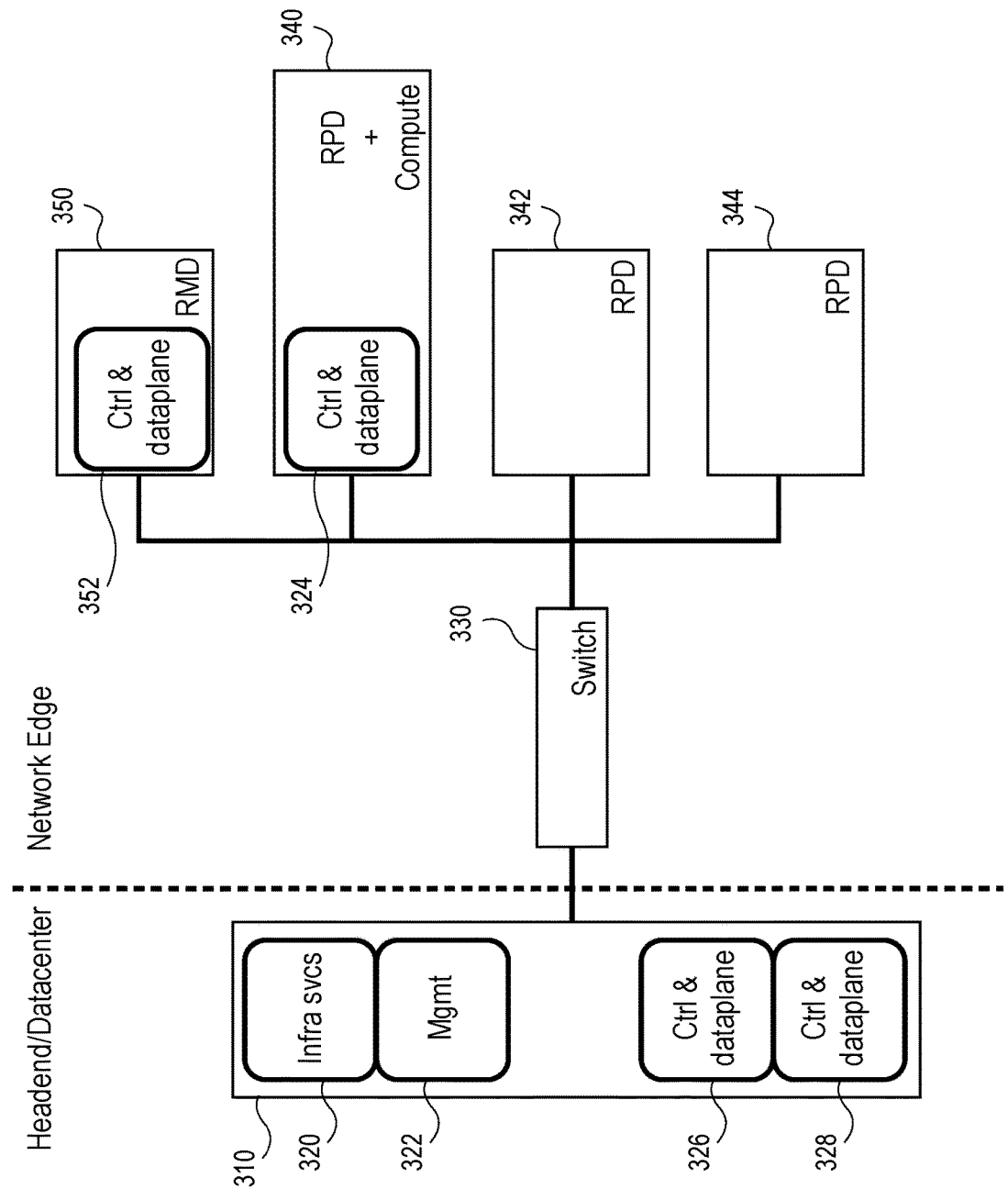
FIG. 5 is a block diagram of an illustrative CDN after the deployment location of a software function was moved from a CCAP to a Remote PHY Device (RPD) in accordance with an embodiment of the invention.

To illustrate certain examples of performing step 220, consider FIG. 5, which is a block diagram of an exemplary CDN of FIG. 4 after the performance of step 220 in accordance with an embodiment of the invention. FIG. 5 depicts the same exemplary of FIG. 4, except that in FIG. 5, the deployment location of software unit 324 was dynamically moved from CCAP 310 in the headend/datacenter to RPD 340. The motivation for doing so in this example is that RPD 340 possessed sufficient compute resources necessary to support the execution of software unit 324. Assume in this example that software unit 324 executing upon RPD 340 is performing the software functions also performed by software unit 352 executing on RMD 350. This enables RPD 340 to behave as a Remote MACPHY device (RMD) even though it is an RPD. The dynamic adjustment of the deployment location of software unit 324 may be performed well after RPD 340 supports sufficient compute resources to execute software unit 324. This allows greater flexibility to a network operator in how their network operates, as software may be dynamically adjusted in real time to modify the behavior of how customers of the network are serviced without incurring the costs normally associated with a substantial change in network operation.

Figure 6:
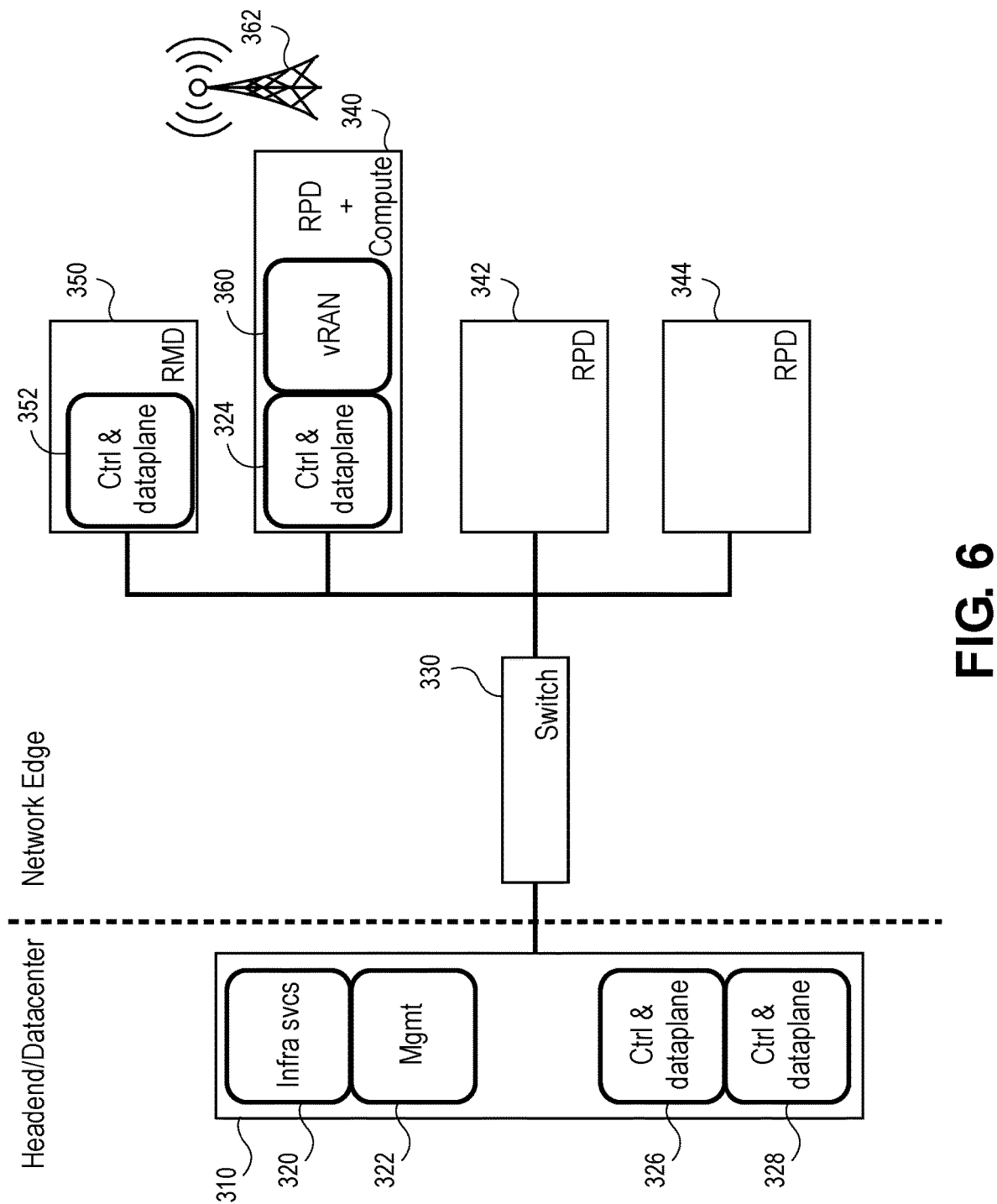
FIG. 6 is a block diagram of an illustrative CDN after the deployment location of a software function performing vRAN functionality was added to a Remote PHY Device (RPD) in accordance with an embodiment of the invention.

FIG. 6 is a block diagram of an exemplary CDN of FIG. 5 after the performance of step 220 in accordance with an embodiment of the invention. FIG. 6 depicts the same components as FIG. 5, with the exception that software unit 360 has been dynamically added to RPD 340 so that it may execute thereon. In this example, software unit 360 performs vRAN functions to allow RPD 340 to communicate wirelessly with radio tower 362. Also note that in this example, software unit 360 was not previously executing on CCAP 310; the deployment location of software unit 360 may be dynamically moved from a prior location but it need not be. This is to say, a software function may also be added to a network component, RPD 340 in this case, without the software function previously being included or performed in the network. In this example, software unit 360 was not previously executing in the network, but naturally in other embodiments it could have been.

Figure 7:
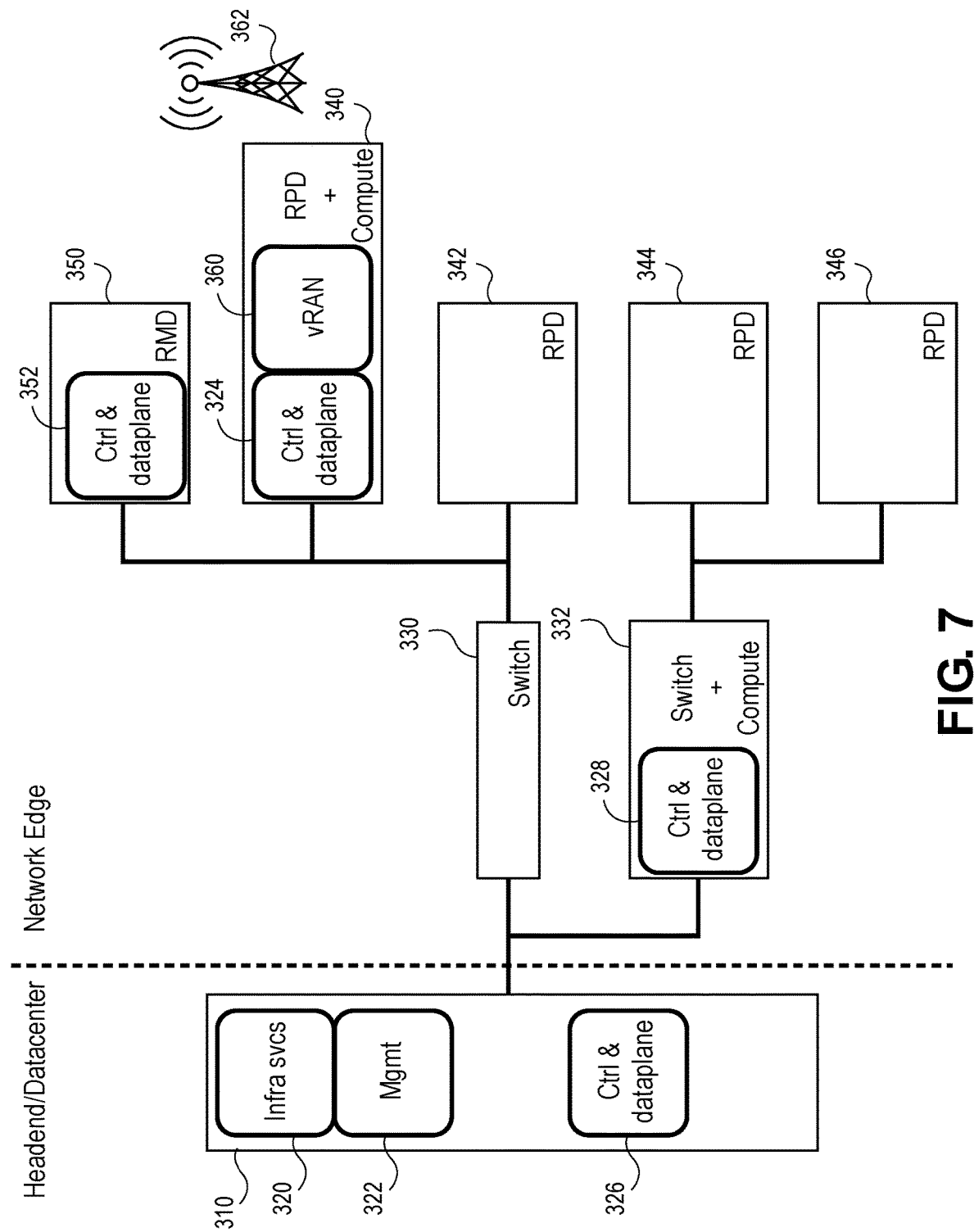
FIG. 7 is a block diagram of an illustrative CDN after the deployment location of a software function was moved from a CCAP to a switch in accordance with an embodiment of the invention.

In the performance of step 220 of FIG. 2, the deployment location of a software function may be moved to a variety of different locations, and not just to a RPD as in the prior examples. To illustrate, consider FIG. 7, which is a block diagram of an exemplary CDN in accordance with an embodiment of the invention. CDN of FIG. 7 comprises two switches, namely switch 330 and 332. FIG. 7 depicts the same components as FIG. 6, with the exception that the deployment location of software unit 328 was dynamically moved in the performance of step 220 from CCAP 310 to switch 332. For example, assume software unit 328 is responsible for managing the control and dataplane of a plurality of RPDs, such as RPD 344 and 346. Adjusting the deployment location of software unit 328 from CCAP 310 to switch 332 enables software unit 328 to take advantage of statistical multiplexing in servicing RPD 344 and 346.

Embodiments of the invention may be used to dynamically adjust the deployment location of software functions that perform a wide variety of activity, including but not limited to video streaming caching, peer-to-peer latency communications (car-to-car, for instance), local advertisement insertion, and location-aware services. To illustrate a few specific examples, in the performance of step 220 of an embodiment, the deployment location of the software function is dynamically moved to an updated deployment location to create a low latency packet stream for a subscriber of a CDN. As another example, in the performance of step 220 of an embodiment, the deployment location of the software function is dynamically moved to the updated deployment location to optimize video streaming for a subscriber of the CDN based on cable modem (CM) bandwidth availability. As another example, in the performance of step 220 of an embodiment, the deployment location of the software function is dynamically moved to the updated deployment location to provide a quality of service associated with a service level for a subscriber of the CDN.

Embodiments may also be used to dynamically adjust the deployment location of software functions to a wide variety of locations, including Internet of Things (TOT) devices. As another example, in an embodiment involving a software-implemented virtual cable modem termination system (CMTS) network, the deployment location of a software function might be dynamically moved from the headend to a location upstream from the headend accessible over the Internet, e.g., in a cloud-network. Similarly, in an embodiment involving a software-implemented virtual cable modem termination system (CMTS) network, the deployment location of a software function that was previously performed in the cloud (i.e., a location accessible over the Internet) might be dynamically moved from the cloud to the cable headend.

Certain embodiments may dynamically move the deployment location of a software function closer to a subscriber of the network upon determining that the software function benefits from lower latency than presently being experienced, as shown in step 212 of FIG. 2B. Conversely, certain embodiments may dynamically move the deployment location of a software function further away from a subscriber of the network upon determining that the software tolerates greater latency than presently being experienced, as shown in step 214 of FIG. 2B. Embodiments of the invention may move the deployment location of software functions closer to the edge of the network (i.e., closer to the network subscribers) for low-latency and location-aware applications, while moving the deployment location of software function away from the network edge (e.g., closer or at the headend in the cable network context) for efficiency (for example, by employing statistical multiplexing over a larger number of subscribers).

Embodiments of the invention enable the deployment location of software functions in the network to be flexibly deployed and adjusted in locations that make sense based on the present use of the network. For example, after assessing a present amount of available compute resources in a portion of the network, adjustments to the deployment location of software functions may be made by embodiments. Certain embodiments need not assess the compute resources available throughout the network to make an adjustment, as only an assessment of the compute resources at the original deployment location and the updated deployment location need be complete before an embodiment may act to dynamically adjust the deployment location of the software function.

Embodiments of the invention advantageously allow for dynamically redistributing software components, or microservices, to adapt to changing requirements, environment, and hardware capabilities. In this way, embodiments make the optimal use of available resources. For example, the deployment location of a software function may be moved to a new deployment location upon determining that the software function benefits from being co-located, at the new deployment location, with one or more of (a) another software function performed at the new deployment location and (b) data present at the new deployment location. Software components may dynamically adjust control and data-plane functions, as well as application-level processes, based on the co-located software functions that are dynamically adjusted to be present within the same execution environment.

Figure 8:
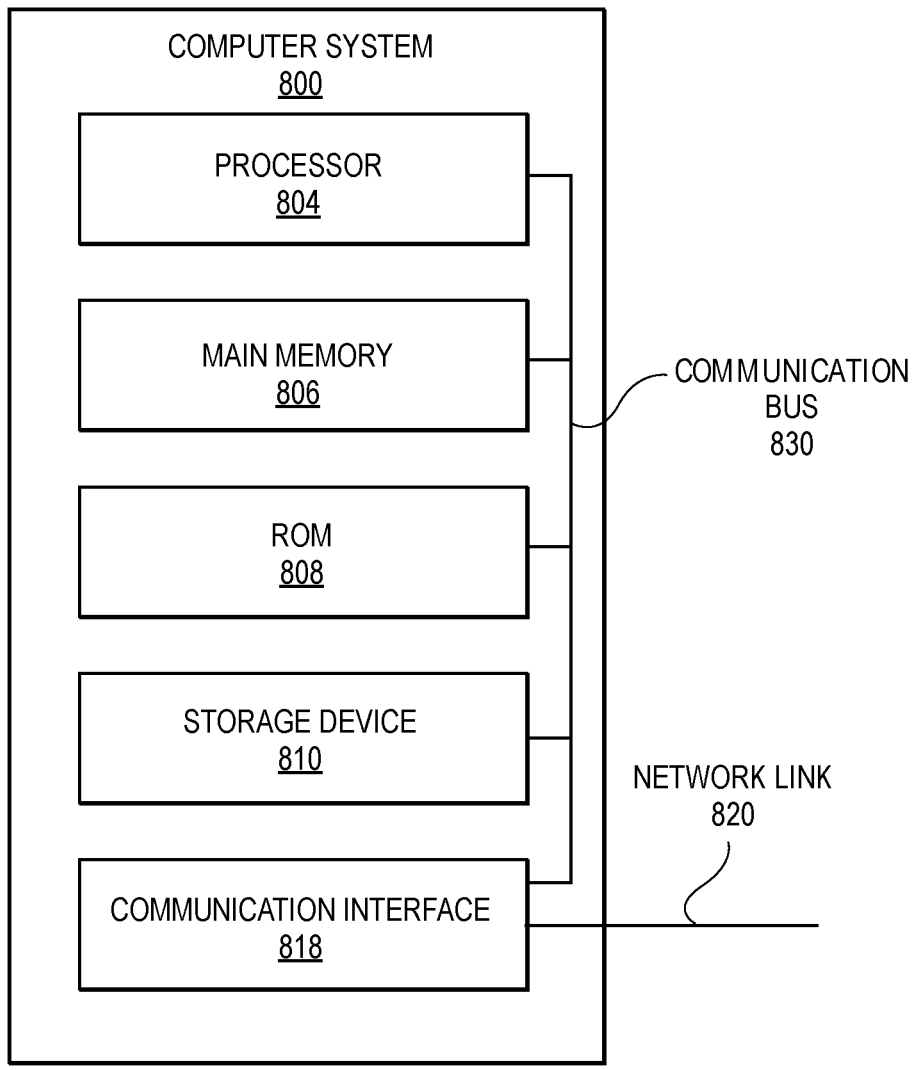
FIG. 8 is a block diagram of a computer system which may serve to provide compute resources and/or implement a node or component of a network in accordance with an embodiment of the invention.

FIG. 8 is a block diagram of a computer system which may serve to provide compute resources and/or implement a node or component of a network in accordance with an embodiment of the invention. For example, the original location and/or updated location of the deployment location of a software function in a network may correspond to a computer system. In an embodiment, computer system 800 includes processor 804, main memory 806, ROM 808, storage device 810, and communication interface 818. Computer system 800 includes at least one processor 804 for processing information. Computer system 800 also includes a main memory 806, such as a random-access memory (RAM) or other dynamic storage device, for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device for storing static information and instructions for processor 804. A storage device 810, such as a magnetic disk or optical disk, is provided for storing information and instructions.

Embodiments of the invention are related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "non-transitory computer-readable storage medium" as used herein refers to any tangible medium that participates in storing instructions which may be provided to processor 804 for execution. Non-limiting, illustrative examples of non-transitory machine-readable media include, for example, a solid-state device, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of non-transitory computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a network link 820 to computer system 800.

Communication interface 818 provides a two-way data communication coupling to a network link 820 that is connected to a local network. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through a local network to a host computer or to data equipment operated by an Internet Service Provider (ISP).

Computer system 800 can send messages and receive data, including program code, through the network(s), network link 820 and communication interface 818. For example, a server might transmit a requested code for an application program through the Internet, a local ISP, a local network, subsequently to communication interface 818. The received code may be executed by processor 804 as it is received, and/or stored in storage device 810, or other non-volatile storage for later execution.

In the foregoing specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage, or attribute that is not expressly recited in a claim should limit the scope of such claim in any way. The specification and drawings are, accordingly, to be regarded in an illustrative rather than a restrictive sense.

What is claimed is:

1. A method for optimizing a performance of a software function within a content delivery network, comprising:
deploying the software function at a headend for a plurality of subscribers; and
after said deploying, dynamically changing a deployment location within the content delivery network for the software function for one or more but not all of said plurality of subscribers from an original location at said headend to an updated location not at said headend using an instance management platform in response to determining said one or more subscribers are entitled to a quality of service associated with a particular service level, wherein said updated location at a Remote PHY device (RPD) is disposed upon a different physical computer system than said original location, and
wherein the software function is one of a set of one or more software functions performed at the Remote PHY device (RPD) to cause the Remote PHY device (RPD) to behave as a Remote MACPHY device (RMD).

2. A non-transitory computer-readable storage medium storing one or more sequences of instructions for optimizing a performance of a software function within a content delivery network, which when executed by one or more processors, cause:
deploying the software function at a headend for a plurality of subscribers; and
after said deploying, dynamically changing a deployment location within the content delivery network for the software function for one or more but not all of said plurality of subscribers from an original location at said headend to an updated location not at said headend using an instance management platform in response to determining said one or more subscribers are entitled to a quality of service associated with a particular service level, wherein said updated location at a Remote PHY device (RPD) is disposed upon a different physical computer system than said original location, and
wherein the software function is one of a set of one or more software functions performed at the Remote PHY device (RPD) to cause the Remote PHY device (RPD) to behave as a Remote MACPHY device (RMD).

3. The non-transitory computer-readable storage medium of claim 2, wherein the content delivery network is a software-implemented virtual cable modem termination system (CMTS) network, a virtualized Radio Access Network (vRAN), a Passive Optical Network (PON), or a Wi-Fi network.

4. The non-transitory computer-readable storage medium of claim 2, wherein the updated location is closer to a subscriber within the content delivery network relative to the original location, and wherein the software function is moved to the updated location upon determining that the software function benefits from lower latency than presently being experienced.

5. The non-transitory computer-readable storage medium of claim 2, wherein the updated location is further away from a subscriber within the content delivery network relative to the original location, and wherein the software function is moved to the updated location upon determining that the software function tolerates greater latency than presently being experienced.

6. The non-transitory computer-readable storage medium of claim 2, wherein the software function is moved to the updated location upon assessing a present amount of compute resources one or more of said original location and said updated location.

7. The non-transitory computer-readable storage medium of claim 2, wherein the software function is moved to the updated location upon determining that the software function benefits from being co-located at said updated location with one or more of (a) another software function performed at said updated location and (b) data present at said updated location.

8. The non-transitory computer-readable storage medium of claim 2, wherein the software function is moved to the updated location is accordance with a predetermined daily schedule.

9. The non-transitory computer-readable storage medium of claim 2, wherein the software function executes in a container or a pod managed by the instance management platform.

10. The non-transitory computer-readable storage medium of claim 2, wherein the content delivery network is a software-implemented virtual cable modem termination system (CMTS) network, and wherein the updated location is at a switch network device or an intermediary device between said headend and customer premises equipment (CPE).

11. The non-transitory computer-readable storage medium of claim 2, wherein the software function is moved to the updated location to optimize video streaming for a subscriber of said content delivery network based on cable modem (CM) bandwidth availability.

12. The non-transitory computer-readable storage medium of claim 2, wherein the software function is moved to the updated location to create a low latency packet stream for a subscriber of said content delivery network.

13. The non-transitory computer-readable storage medium of claim 2, wherein the software function is moved to the updated location in response to receipt of a machine learning recommendation and not based on manual intervention or instruction.

14. A system for optimizing a performance of a software function within a content delivery network, comprising:
one or more processors; and
one or more non-transitory computer-readable storing mediums storing one or more sequences of instructions, which when executed, cause:
deploying the software function at a headend for a plurality of subscribers; and
after said deploying, dynamically changing a deployment location within the content delivery network for the software function for one or more but not all of said plurality of subscribers from an original location at said headend to an updated location not at said headend using an instance management platform in response to determining said one or more subscribers are entitled to a quality of service associated with a particular service level, wherein said updated location at a Remote PHY device (RPD) is disposed upon a different physical computer system than said original location, and
wherein the software function is one of a set of one or more software functions performed at the Remote PHY device (RPD) to cause the Remote PHY device (RPD) to behave as a Remote MACPHY device (RMD).

15. The system of claim 14, wherein the software function is moved to the updated location in response to receipt of a machine learning recommendation and not based on manual intervention or instruction.

16. The system of claim 14, wherein the content delivery network is a software-implemented virtual cable modem termination system (CMTS) network, a virtualized Radio Access Network (vRAN), a Passive Optical Network (PON), or a Wi-Fi network.

17. The system of claim 14, wherein the updated location is closer to a subscriber within the content delivery network relative to the original location, and wherein the software function is moved to the updated location upon determining that the software function benefits from lower latency than presently being experienced.

18. The system of claim 14, wherein the updated location is further away from a subscriber within the content delivery network relative to the original location, and wherein the software function is moved to the updated location upon determining that the software function tolerates greater latency than presently being experienced.

19. The system of claim 14, wherein the software function is moved to the updated location to optimize video streaming for a subscriber of said content delivery network based on cable modem (CM) bandwidth availability.

20. The system of claim 14, wherein the software function is moved to the updated location to create a low latency packet stream for a subscriber of said content delivery network.

* * * * *